(12) United States Patent
Jablonski

(10) Patent No.: US 11,664,978 B2
(45) Date of Patent: May 30, 2023

(54) SYSTEMS, METHODS AND SOFTWARE FOR SECURE ACCESS CONTROL TO DIGITALLY STORED INFORMATION

(71) Applicant: Fidelius, LLC, Portland, OR (US)

(72) Inventor: Zachary A. Jablonski, Portland, OR (US)

(73) Assignee: Fidelius, LLC, Portland, OR (US)

( * ) Notice: Subject to any disclaimer, the term of this patent is extended or adjusted under 35 U.S.C. 154(b) by 126 days.

(21) Appl. No.: 17/339,646

(22) Filed: Jun. 4, 2021

(65) Prior Publication Data

US 2021/0385076 A1 Dec. 9, 2021

Related U.S. Application Data

(60) Provisional application No. 63/034,553, filed on Jun. 4, 2020.

(51) Int. Cl.
| | |
|---|---|
| *H04L 9/08* | (2006.01) |
| *H04L 29/08* | (2006.01) |
| *H04L 67/1097* | (2022.01) |
| *H04L 67/06* | (2022.01) |

(52) U.S. Cl.
CPC .......... *H04L 9/0825* (2013.01); *H04L 9/0833* (2013.01); *H04L 67/06* (2013.01); *H04L 67/1097* (2013.01)

(58) Field of Classification Search
CPC ..... H04L 9/0825; H04L 9/0833; H04L 67/06; H04L 67/1097; H04L 9/085; H04L 63/0478; H04L 63/10; H04L 9/14; H04L 9/08; H04L 29/08; G06F 21/6245
See application file for complete search history.

(56) References Cited

U.S. PATENT DOCUMENTS

| | | | | |
|---|---|---|---|---|
| 8,571,980 B1* | 10/2013 | Greenwood | ........... | G06Q 40/02 705/39 |
| 2016/0162693 A1* | 6/2016 | Breuer | .................. | G06F 3/0637 713/164 |
| 2021/0218720 A1* | 7/2021 | Oberhauser | ......... | H04L 63/0442 |

* cited by examiner

*Primary Examiner* — Quazi Farooqui

(57) ABSTRACT

Systems, methods, and software for secure access control to digitally stored information. Owners of digitally stored information enter access control data using a first graphical user interface (GUI) on a first device. Vault space is allocated in memory for receiving and storing the information remotely from the first device. A keyholder and a guardian identified by the access control data are associated with the information. A keyholder access request for the information is transmitted via a second GUI on a second device. Responsive to determining the keyholder to be associated with the information, a third device of a guardian receives a notification of the access request, and the guardian may use a third GUI to transmit an access authorization. The information may be transmitted to the second device upon determining that the guardian is associated with the information.

21 Claims, 9 Drawing Sheets

SYSTEMS, METHODS AND SOFTWARE FOR SECURE ACCESS CONTROL TO DIGITALLY STORED INFORMATION

CROSS-REFERENCE TO RELATED APPLICATIONS

This application claims priority to U.S. Provisional Application Ser. No. 63/034,553 filed Jun. 4, 2020, which is incorporated herein by reference in its entirety for all purposes.

BACKGROUND

A variety of types of personal and business information is stored in digitally encoded files for current or later use. Such information ranges from photos, videos and other digital media to financial information, intellectual property, and online account usernames and passwords. The owner of such information may or may not be the original creator of it. Oftentimes, in the course of personal affairs or business operations, the owners wish to share the information with others who have a need to view, modify, or otherwise use it.

Hard drives and other data storage devices have ever larger storage capacities. In recent times, the expansion of cloud-based storage remotely accessible via the Internet or other communications networks have provided added convenience and security to owners of digitally stored information. For instance, an owner can create an account on one of many providers' websites with a unique username and password, create folders according to various types and categories of data, and store the specific files to their respective folders. Once the files arrive at the cloud storage provider's server(s), the owner's data may be stored in an encrypted form. The owner, upon logging in to the provider's website using the username and password, can then access the files as desired.

Known online storage platforms can have a file sharing functionality. In that case, the owner may generate a link for a specific file, or for a folder having one or more files, stored on servers associated with their account. People other than the owner of the digital content can be specified and a unique link may be generated that can be emailed to the other people or written down or printed and manually delivered to them. In some cases, a user of a particular platform other than the owner, and who also has account login credentials, can be specified by the owner such that the other user can access the files and folders through the platform via their own account. As can be seen with such known cloud-based storage and sharing platforms, once content is uploaded to one user's account and sharing enabled, the other user with whom the content was shared may download it with little to no further control by the original owner.

In some cases, an owner may desire to grant access through a more indirect or contingent process. In some known systems and methods, secure cloud storage may be implemented for escrow transactions where data may be released to specified parties upon the occurrence of some event. Similarly, password management providers may allow users to store such sensitive information as username and password combinations. Also, at least some such secure online data storage platforms allow data owners to also add emergency users with time-delayed approval.

While the various known systems, methods and software for secure online storage and sharing of digital information provide owners and other users remote, secure and encrypted databases, they can still suffer from technical and usability drawbacks for at least some owners and users. Despite the several user-facing access control and sharing features of existing cloud storage and sharing platforms, such features may be limited even in "premium" subscription services, and as such may not meet the technical specifications required by at least some business and personal users.

Accordingly, a need exists for technology that overcomes the problems demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following detailed description.

SUMMARY

The present technology provides systems, methods, and software for secure access control to digitally stored information. Owners of digitally stored information enter access control data using a first graphical user interface (GUI) on a first device. Vault space is allocated in memory for receiving and storing the information remotely from the first device. A keyholder and a guardian identified by the access control data are associated with the information. A keyholder access request for the information is transmitted via a second GUI on a second device. Responsive to determining the keyholder to be associated with the information, a third device of a guardian receives a notification of the access request, and the guardian may use a third GUI to transmit an access authorization. The information may be transmitted to the second device upon determining that the guardian is associated with the information. In practice, embodiments of the present technology provide numerous technical advantages and improvements for access control and sharing to data stored in the cloud, and to the user experience for owners of data residing in the cloud.

Examples of embodiments of the present technology are provided and described in the Detailed Description with reference to the Drawings. Further examples are provided at the following websites, the entire contents of each of which is incorporated by reference: www.fideliusvaults.com; www.fideliusvaults.com/how-it-works/; www.fideliusvaults.com/faq/.

BRIEF DESCRIPTION OF THE DRAWINGS

One or more embodiments of the present invention are illustrated by way of example and not limitation in the figures of the accompanying drawings, wherein alphanumeric labels correspond to their mention in the Detailed Description.

DETAILED DESCRIPTION

Figure 1:
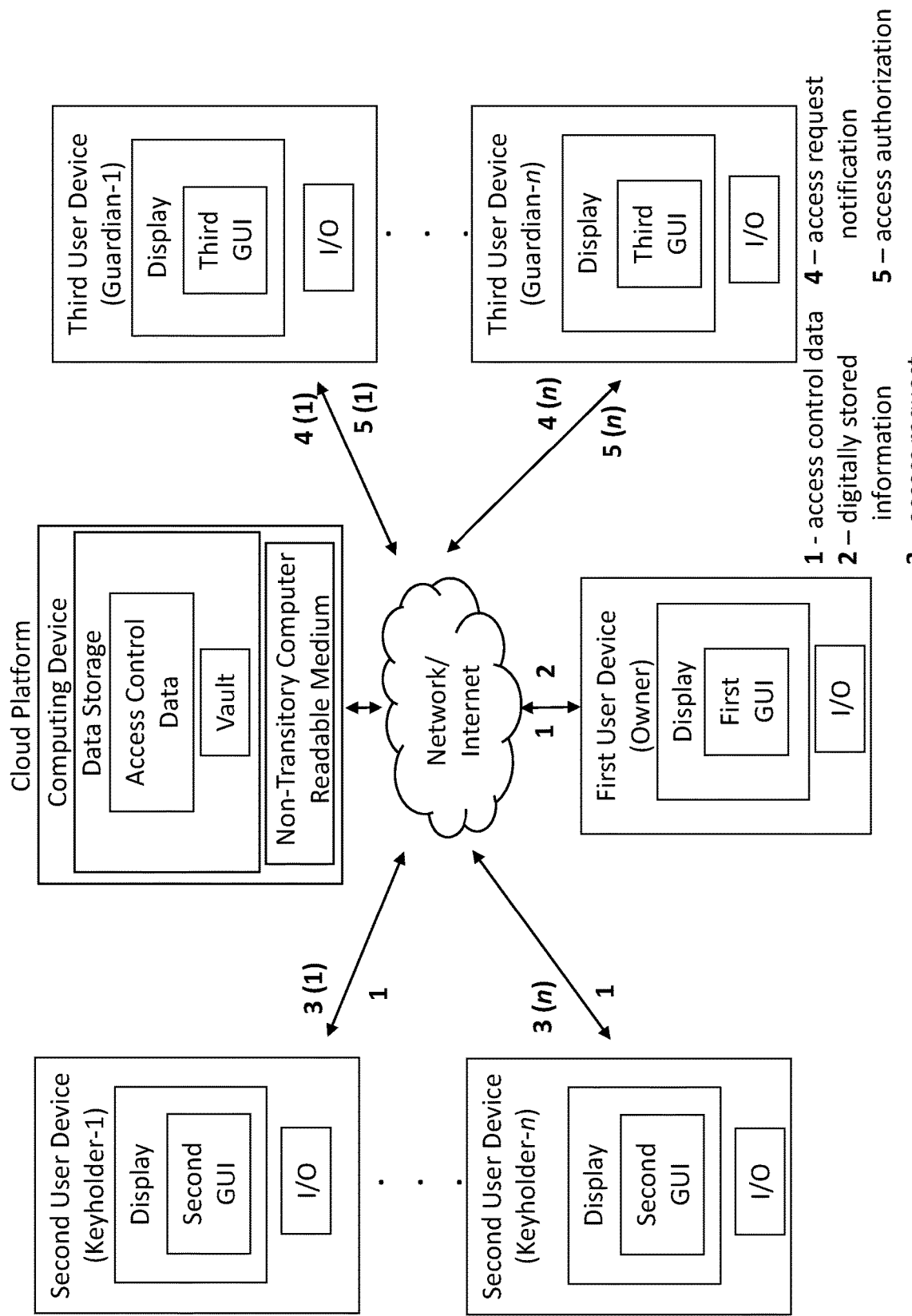
FIG. 1 depicts a block diagram of a computing and communication architecture in which a system for secure access control to digitally stored information may be implemented in accordance with some embodiments.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods, computing processes and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

This present disclosure describes computing, communication and data storage systems, methods, and software for secure access control to digitally stored information. The embodiments of the present disclosure improve upon, and provide unique technical benefits to, technology fields including cloud-based data storage and sharing, including as they may be provisioned to users as software-as-a-service (SaaS). The various technical benefits and effects of the disclosed embodiments are implemented specifically and exclusively in specialized computing, communication and data storage devices and systems. Although some such devices and their interconnections may be known to persons of ordinary skill in the art, their configuration and use as described herein provides an advantageous contribution both to the technical problem of access control and sharing to data stored in the cloud, and to the user experience for owners of data residing in the cloud according to the disclosed embodiments.

As will become apparent to persons skilled in the art, the disclosed embodiments are not merely process steps capable of being performed using generic computing devices, but which could be performed mentally or otherwise by a human being, including with the aid of pen and paper. Rather, the unique algorithms described herein are required to be encoded in software instructions to direct (e.g., "cause") the physical actions of the various computing, communications and data storage devices in a manner believed to be as yet unknown in the pertinent technological field. These physical effects and actions include, without limitation, transmission of encoded data as signals over wired or wireless communication channels, both within one particular computing device and over great distances over spans of the Earth or outer space. The described algorithms direct data to be stored according to received data inputs of the data owners via graphical user interfaces that are transmitted to, and displayed on, user devices like personal computers and smartphones in communication with remote servers. All of these actions, and numerous others that are described herein, are performed by physical computing and communication devices, as directed by the disclosed algorithms. Furthermore, the physical actions which are specifically caused to occur using computing devices having processors taking as commands encoded software or firmware instructions stored in non-transient computer-readable storage media are performed and coordinated thereby in substantially real-time. Real-time is defined as a very nearly instantaneous result of an input, stimulus, or computation performed by a computing device as described herein, where the timing of a subsequent action is limited only by the physical makeup or design of the computing device and communications network. For example, a duration between a time upon which a result of a first computation is generated by a first networked computing device and a time that result becomes available for a subsequent computation by a second networked computing device may be limited only by a transmission time required by the physical medium of the wired, optical or wireless network connecting the first and second computing devices. A person having ordinary skill in the art will recognize and appreciate that not only are the disclosed algorithms incapable of being performed mentally by a human being, they are certainly not capable of being performed mentally with the aid of pen and paper in real time, or otherwise by a human being within a time sufficient to provide both the disclosed technical advantages and effects, and the improved user experience, in the practical application to the pertinent technological field.

More particularly, the disclosed embodiments enable data owners utilizing cloud-based data storage and sharing platforms to uniquely customize access and sharing privileges through a single online platform and graphical user interface. As one example, the disclosed systems, methods and software for access control to digitally stored information improve the functioning of such devices in the aforementioned technical and practical application to provide added assurances to data owners that trusted friends, colleagues, or family can access particular files or other content after an occurrence of an emergency, with that trust and assurance put in place prior to the occurrence of the emergency. However, in contrast to at least some known systems and methods, the disclosed embodiments allow the access control to be customized such that, if the data owner wants to wait until something happens in a manner where the owner is unable to direct and have implemented an access configuration change, the owner can create online vaults to store their files or documents. The disclosed technology "guards" the owner's vaults using trusted "guardians" of the data stored on the disclosed platform. In an emergency situation, these "Guardians" are one or more people acting as the owner's proxy to decide if a "Keyholder" should be granted access to the "Owner's" vault. Thus, the disclosed technology both protects and secures the owner's digitally stored information, and makes sure it is available when it matters most to the owner and those (the "keyholders") he or she wishes to gain access to the content.

FIG. 1 depicts a block diagram of a system for access control to digitally stored information, according to an embodiment. The computing device illustrated in FIG. 1 may be a server having at least one computer processor in communication with a data storage device. A non-transitory computer readable storage medium stores program instructions encoded in software which, when executed by the computing device, cause the computing device to execute, perform, or other facilitate the various algorithms, processes, and methods for secure access control to digitally stored information as described herein.

As shown in FIG. 1, user devices are operably coupled to the computing device for purposes of data communication by way of wired and/or wireless communication using a network (e.g., the Internet). These illustrated first, second, and third user devices are "local" computing devices other than the labeled computing device, which is a "cloud" computing device. For example, and without limitation, the various user devices shown in FIG. 1 include personal computers, smartphones and tablet devices, among other types. The user devices include display devices and input/output (I/O) devices (e.g., a keyboard and mouse) for use in viewing and entering alphanumerical data, directing and responding to prompts, and otherwise interacting with content caused to be displayed to users on the user devices. In some embodiments, the first user device is: not accessible by the at least one keyholder, and not accessible by the at least one guardian.

In FIG. 1, "first", "second" and "third" user device(s) are shown as physically distinct devices. The methods and systems disclosed herein may be similarly described below, by way of example only, in the context of physically separate first, second and third user devices. It is strongly noted, however, that any combination of two or more of the first, second and third user devices can be embodied in a single physical device, and the correspondingly described computer implemented methods can proceed in an analogous manner as in the various embodiments disclosed herein, and without departing from the scope and spirit of the present technology. So, for instance, an Internet-connected personal computer device can be situated in a home where the disclosed "owner," "keyholder(s)," and "guardian (s)" all reside. Each of these "users" can use the shared home computer to separately login or otherwise interact with a cloud computing platform (e.g., FIDELIUS), just as they would by using the home computer to access their personal email using an online email provider. In such cases, the home computer can, using single device, assume the structure and function of the disclosed "first", "second" and "third" user device(s) depending on which of the "owner", "keyholder(s)", and "guardian(s)" are using it to interact with the disclosed cloud-based secure access control platform. This can likewise be the case for sharing of other devices such as smartphones and tablets, and the aforementioned analogy would equally hold in home and work alike, or in any other use environment where shared computers may be utilized by the "owner," "keyholder(s)," and/or "guardian(s)".

Figure 2A:
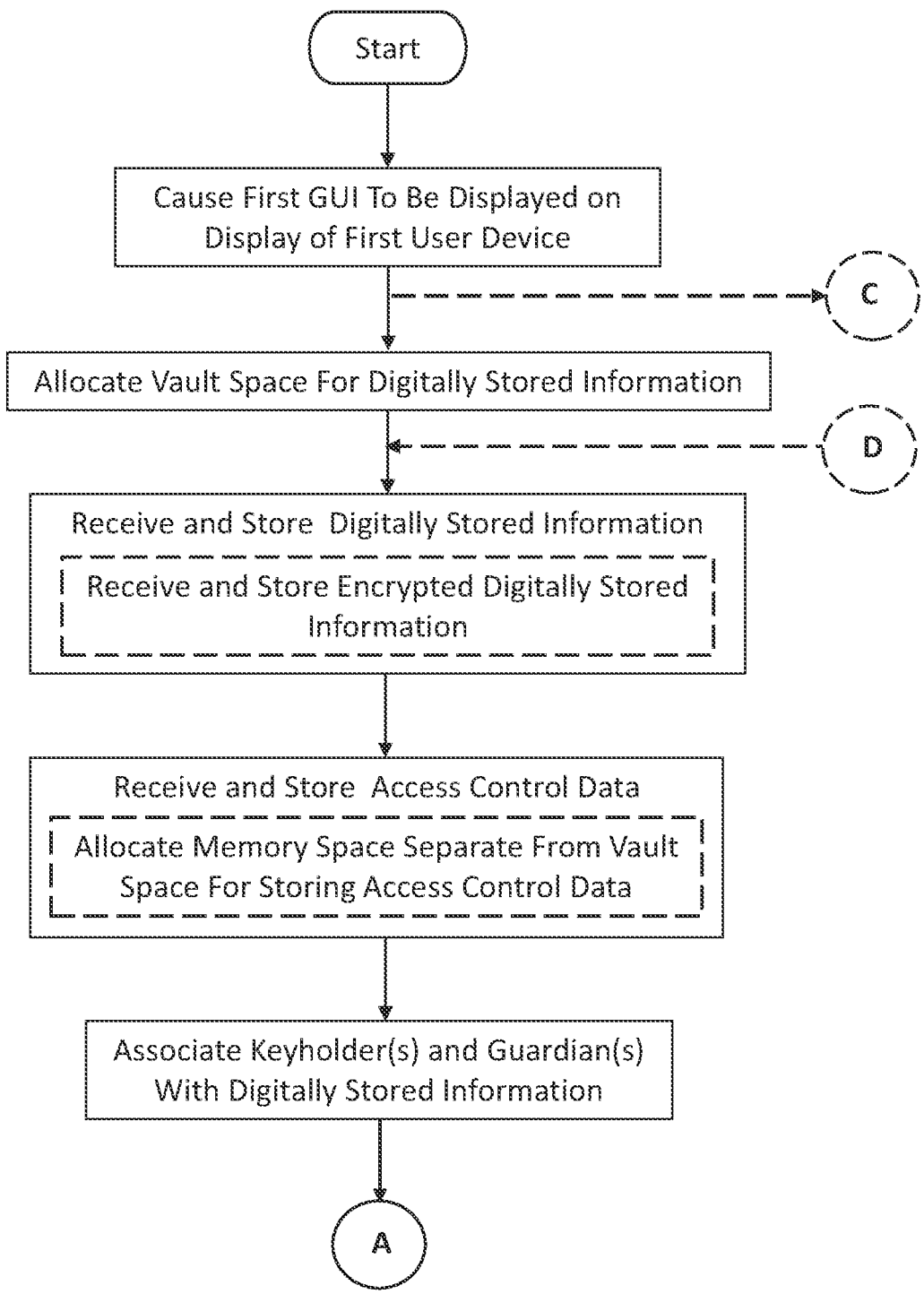
FIGS. 2A-2C depict flow charts of a method executed on the computing device shown in FIG. 1 to provide access control to digitally stored information in accordance with some embodiments.
Figure 2B:
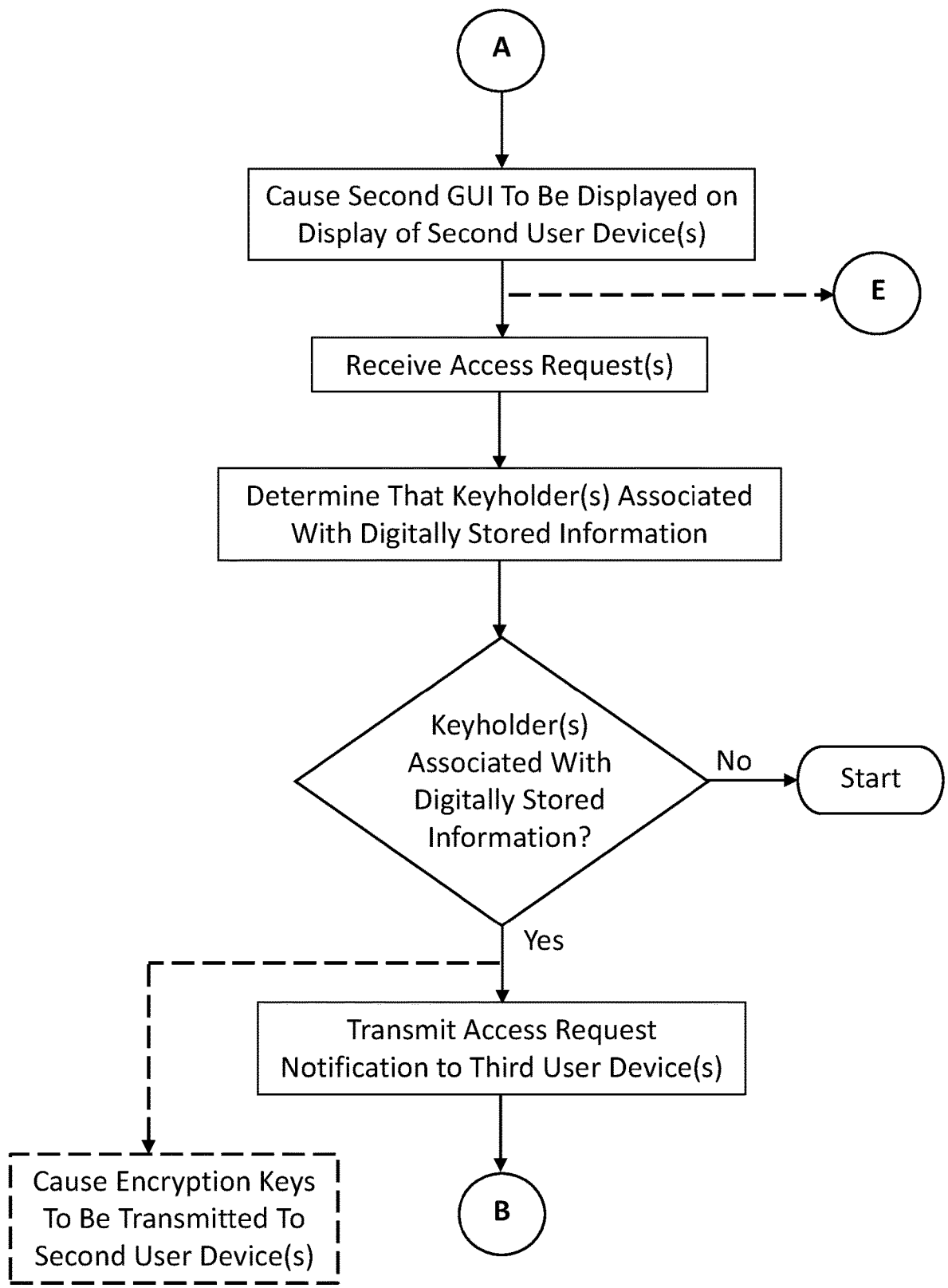
Figure 2C:
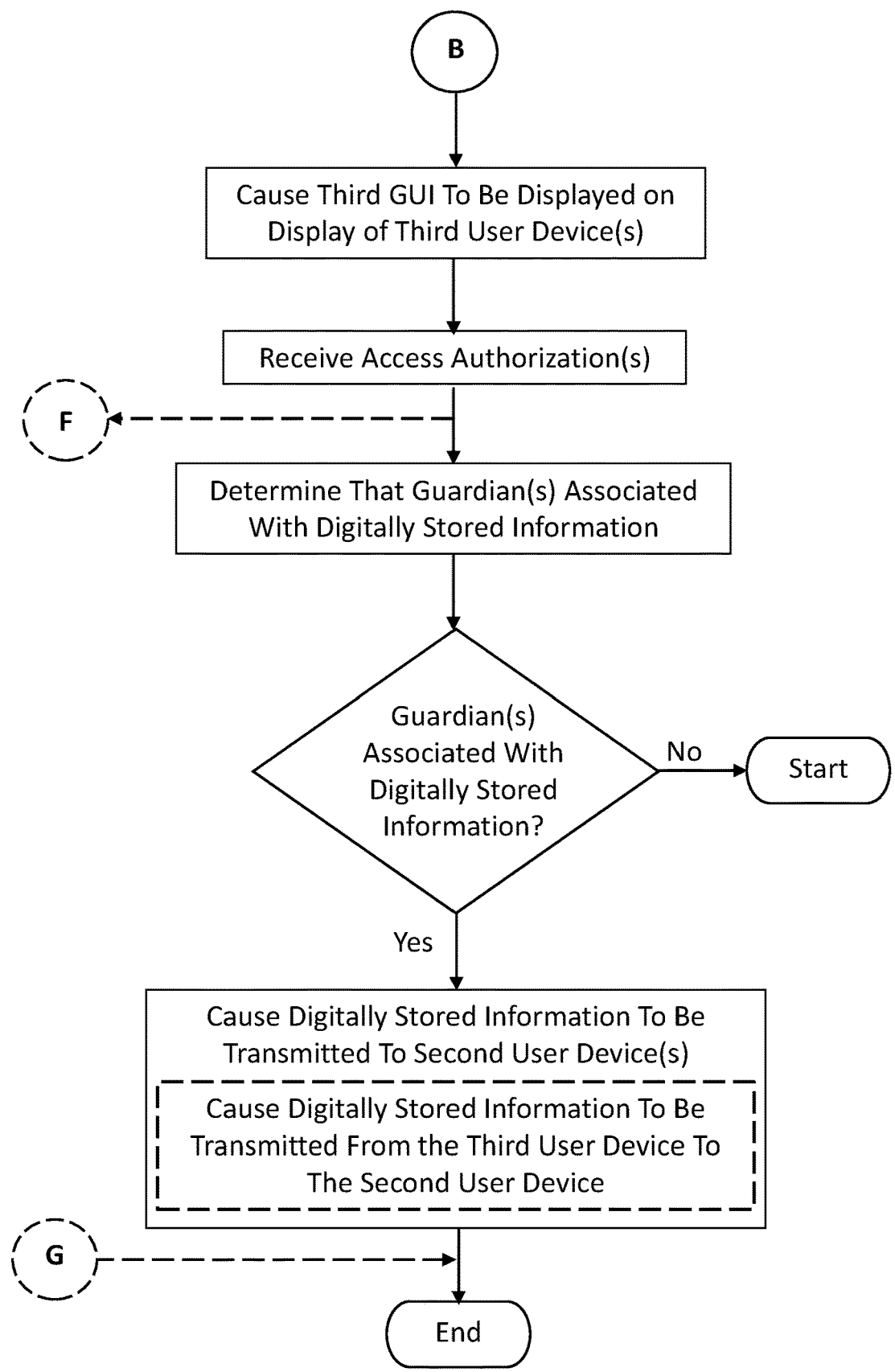

In FIGS. 2A-2C, circles having a letter in them denote process flow transitions between different figures. Still with reference to FIG. 1, and referring now as well to FIGS. 2A-2C, a method executed on the computing device to provide secure access control to digitally stored information begins with a start state. In the start state, a user who owns digitally stored information and wishes to obtain secure access control over it using the disclosed technology has obtained an account with the provider of the secure access control cloud provider represented, at least in part, by the computing device of FIG. 1. The method includes the step of causing a first graphical user interface (GUI) to be displayed on a display device of a first user device accessible by an owner of the digitally stored information. The first GUI includes graphical and textual information that is transmitted from, for example, the computing device of FIG. 1 to the first user device, where such data is then rendered on the display as an Internet webpage. In the case of first user device embodied in a smartphone, these data may be rendered on the display as an app screen. The first GUI facilitates entry by the owner of access control data for the digitally stored information.

The method includes the step of allocating, in at least one data storage device in communication with the computing device, vault space for storing the digitally stored information in a location remote from the first user device. In some embodiments, the allocating step may be performed during or after the owner establishing their account with the cloud platform. After, or concurrently with, performance of the allocating step, the method includes receiving, and storing in the vault space, the digitally stored information from the first user device.

The method includes receiving, from the first user device, the access control data. The access control data includes identifying information of: at least one keyholder, and at least one guardian. This can include names, email addresses, phone numbers, and the like that are uniquely associated with the people who the owner designates for the secure access control method, as described herein. In some embodiments, the method includes allocating, in the at least one data storage device, memory space separate from the vault space for storing the access control data. Either of the aforementioned allocating steps of the method may be performed during or after the owner registers their account with the cloud platform (e.g., FIDELIUS) at the website www.fideliusvaults.com (the entire contents of which are incorporated herein by reference). Next, the method includes associating the at least one keyholder and the at least one guardian with the digitally stored information.

Now referring to FIGS. 1 and 2B, the method includes causing a second GUI to be displayed on a display device of a second user device accessible by the at least one keyholder. The second GUI includes graphical and textual information that is transmitted from, for example, the computing device of FIG. 1 to the second user device(s), where such data is then rendered on the display(s) as an Internet webpage. In some embodiments, the keyholder is required to register an account with the cloud platform. In other examples, the method can be fully performed in the absence of the keyholder registering such an account. In the case of second user device(s) embodied in smartphone(s), these data may be rendered on the display as an app screen. The second GUI facilitates transmission, to the computing device, by the at least one keyholder of an access request to the digitally stored information.

The method includes receiving, from the second user device, the access request. Based at least upon the identifying information (e.g., keyholder ID), the method then proceeds to the step of determining that the at least one keyholder is associated (e.g., by the aforementioned associating step) with the digitally stored information. Where the method does not determine that the at least one keyholder is not associated with the digitally stored information belonging to the owner, the method proceeds back to the start state. On the other hand, in response to determining that the at least one keyholder is associated with the digitally stored information, the method includes transmitting, according to at least the identifying information, an access request notification to a third user device accessible by the at least one guardian. The access request notification includes at least a portion of the identifying information of the at least one keyholder.

Referring now to FIGS. 1 and 2C, the method includes causing a third GUI to be displayed on a display device of the third user device. The third GUI includes graphical and textual information that is transmitted from, for example, the computing device of FIG. 1 to the third user device(s), where such data is then rendered on the display(s) as an Internet webpage. In some embodiments, the guardian is required to register an account with the cloud platform. In other examples, the method can be fully performed in the absence of the guardian registering such an account. In the case of third user device(s) embodied in smartphone(s), these data may be rendered on the display as an app screen. The third GUI facilitates transmission, to the computing device, by the at least one guardian of an access authorization for the digitally stored information.

In FIG. 1, "first", "second" and "third" GUIs are shown as physically distinct things generated on respective display devices of the first, second and third user device(s). The methods and systems disclosed herein may be similarly described herein, by way of example only, in the context of unique first, second and third user GUI(s). It is strongly noted, however, that any combination of two or more of the first, second and third GUI(s), at least as they are first generated on the respective display devices for viewing by the "owner", "keyholder(s)", and "guardians", can be embodied in a single GUI having a plurality of GUI touchpoints, buttons, or drop down list selections that the "owner", "keyholder(s)", and "guardian(s)" can use to navigate to GUI content that can be specifically geared to their respective roles, as described herein. In such cases, the method steps of causing first, second and third GUIs to be displayed on respective display devices of the first, second and third user devices can include first causing a common landing page GUI to be displayed on the respective display devices, and then, responsive to receiving a role-related input from the "owner", "keyholder(s)", and "guardian(s)", further causing a role-specific GUI to be displayed on the respective display devices based on the respective role. In other embodiments, the "owner", "keyholder(s)", and "guardian(s)" first login to the online platform (e.g., FIDELIUS) from a common landing page and the method can include causing the role-based GUI to be displayed on the respective display device according to the role of the logged in user, where the role is associated with the user and can be stored in data storage by the computing device as a part of, for instance, the access control data. In any event, role-based functions are enabled in the disclosed systems, methods and software according to the role of the user interacting with the computing device of FIG. 1 with the respective GUI(s). More generally, such roles can govern specific rights and permissible actions with respect to reading, writing and deleting data in the data storage (e.g., digitally stored information in the disclosed vault and/or access control rights).

The method includes receiving, from the third user device, the access authorization. Based at least upon the identifying information (e.g., guardian ID), the method then proceeds to the step of determining that the at least one guardian is associated with the digitally stored information. Where the method determines that the at least one guardian is not associated with the digitally stored information belonging to the owner, the method proceeds back to the start state. On the other hand, in response to determining that the at least one guardian is associated with the digitally stored information, the method includes causing the digitally stored information to be transmitted to the second user device(s), where it may be used by the keyholder(s) according to preconfigured wishes of the owner.

Figure 3:
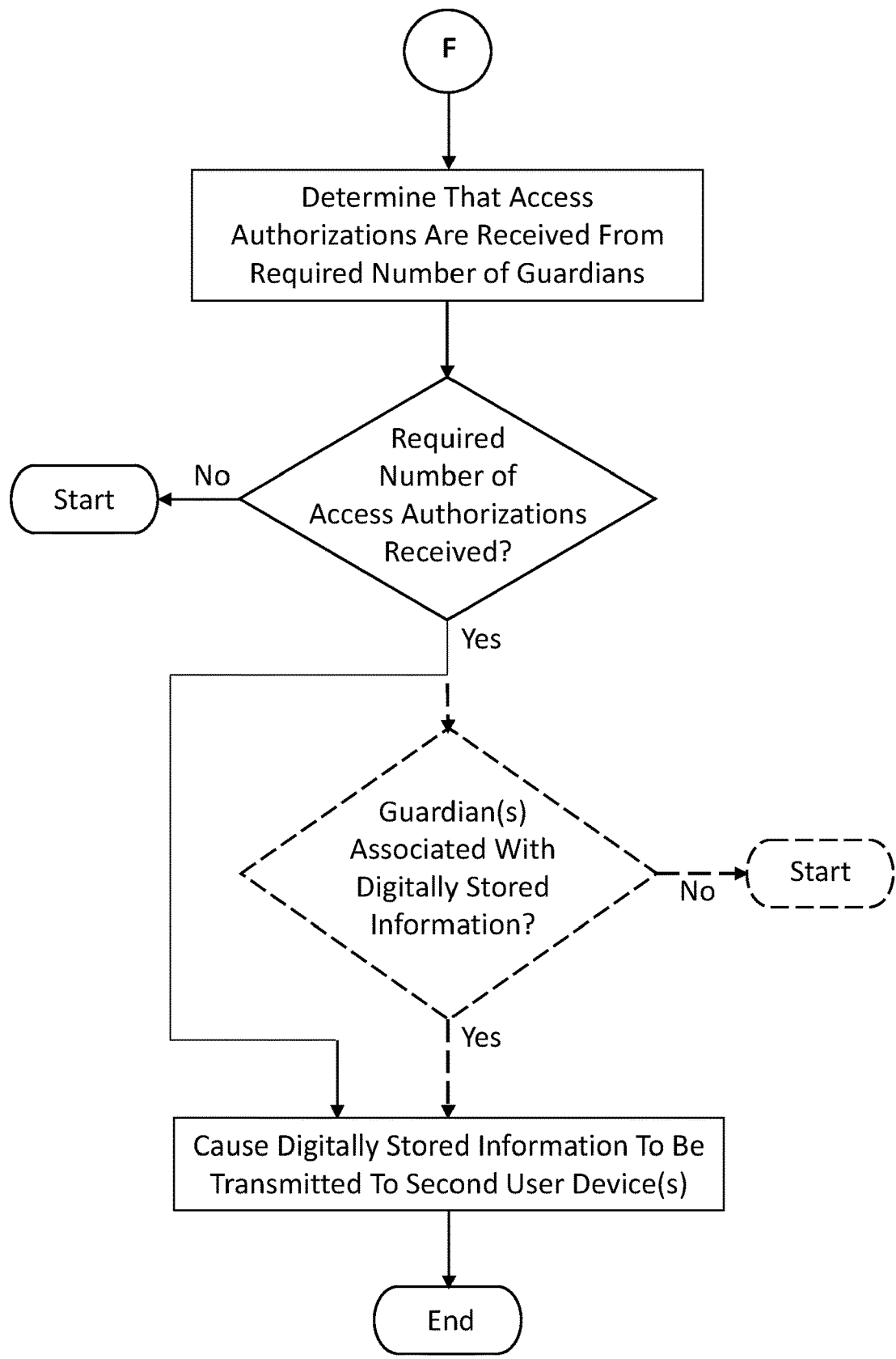
FIG. 3 depicts a flow chart of aspects of the method shown in FIGS. 2A-2C in accordance with some embodiments.

In some embodiments, as shown in FIGS. 1, 2C and 3, the at least one guardian includes a plurality of guardians. Each guardian of the plurality of guardians has unique identifying information. In an example, the access control data further includes an owner-specified required number of the plurality of guardians from whom access authorizations must be received in the method. In the example, the method further includes the step of determining that access authorizations are received from the required number of the plurality of guardians. A preset period of time may be specified by the owner for the method to wait for receiving the required number of the plurality of guardians to provide their access authorizations.

In the embodiment of FIG. 3, if the required number of access authorizations are not received from the respective guardians in the method, then the method proceeds back to the start state. In cases where the required number of access authorizations are received, the method proceeds to the step of causing the digitally stored information to be transmitted to the second user device of the keyholder. In one example, the method may proceed to cause the digitally stored information to be transmitted from the data storage device associated with the online secure access control platform (e.g., FIDELIUS) to the second user device in the absence of also determining that the guardians who provided the required number of access authorizations are associated with the digitally stored information. This alternate case is denoted in FIG. 3 by the dashed lines, and would result in the method proceeding back to the start state in the event that either of the following conditions are determined to be not met by the computing device: receipt of the required number of access authorizations, and one or more of the respective guardians are not associated with the digitally stored information. In another example, the method proceeds to determine both that the required number of access authorizations are received and to also determine that the respective guardians are associated with the digitally stored information. In this case, those two determinations in the method can be performed in any order. When the method includes the step of determining that the required number of access authorizations are received, whether or not the step of determining that the guardians are associated with the digitally stored information in the method can be an option specified by the owner during their registration for, and input of preferences related to, operation of the online secure access platform (e.g., FIDELIUS).

Figure 4A:
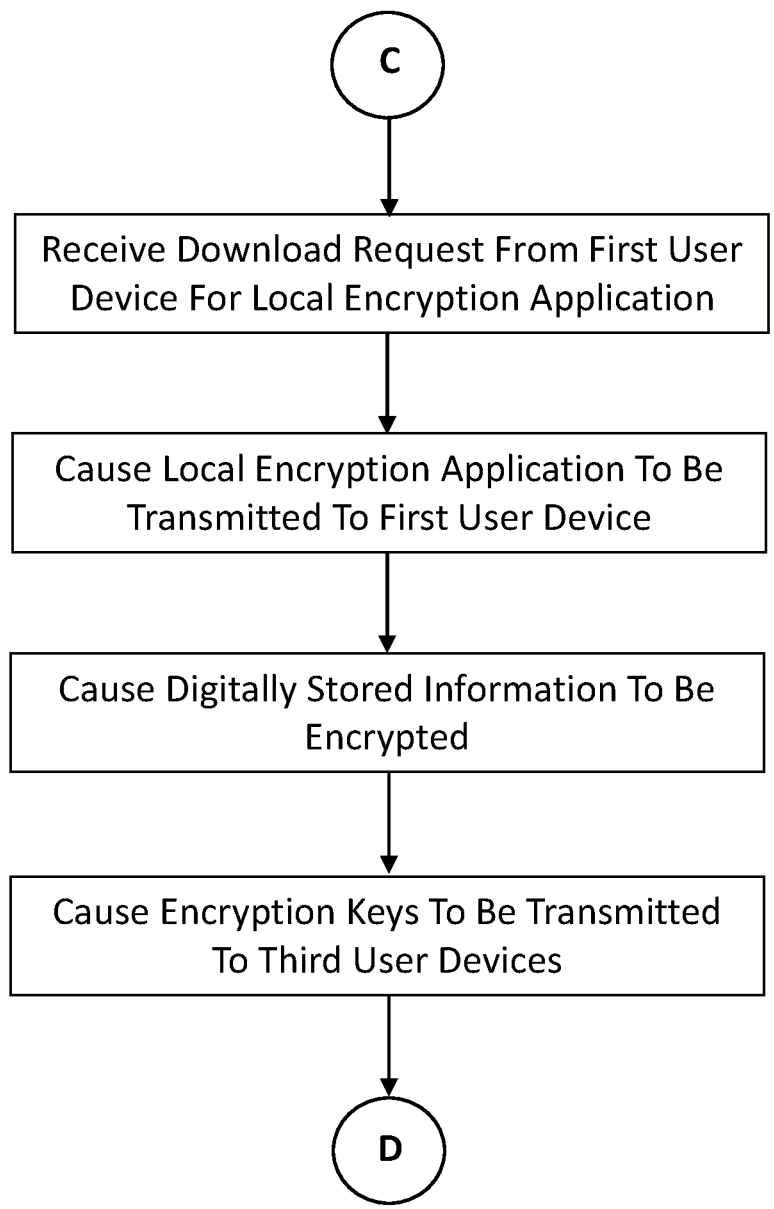
FIGS. 4A and 4B depict flow charts of aspects of the method shown in FIGS. 2A-2C and 3 in accordance with some embodiments.

With reference to FIGS. 1, 2A-2C and 4A, another embodiment of the method is disclosed where the at least one guardian includes a plurality of guardians, where each guardian has unique identifying information, and where the access control data further includes an owner-specified required number of the plurality of guardians from whom access authorizations must be received in the method. In the embodiment, the first GUI further facilitates downloading, by the owner, a local encryption application to the first user device. As shown in FIG. 4A, the method further includes receiving, from the first user device, a download request for the local encryption application. In response to receiving the download request, the method includes causing the local encryption application to be transmitted to the first user device.

In the embodiment shown in FIG. 4A, prior to performing the step of receiving, and storing in the vault space, the digitally stored information from the first user device, the method includes causing the digitally stored information to be encrypted using a number of encryption keys equal to a number of the plurality of guardians. Each of the number of encryption keys are required to decrypt the encrypted digitally stored information. This encryption can be performed entirely locally on the first user device such that no unencrypted digitally stored information is transmitted to the computing device over the network and likewise no unencrypted digitally stored information is stored remotely from the first user device of the owner. As such, in the embodiment, the method step of receiving, and storing in the vault space, the digitally stored information from the first user device can include receiving, and storing in the vault space, the encrypted digitally stored information from the first user device.

In the embodiment of FIG. 4A, the method can include causing one encryption key of the number of encryption keys to be transmitted to a respective third user device accessible by each of the plurality of guardians. In an example, the local encryption application mediates or otherwise facilitates this causing step in the method by, for instance, establishing a secure line of data communication between the first user device and the respective third user devices for transmission of each of the encryption keys. In another example, the local encryption application provides alphanumeric and/or graphical instructions readable by the owner which direct the owner to transmit (e.g., by email) or otherwise provide the encryption keys to the chosen guardians. Then, in the embodiment, further in response to determining that the at least one keyholder is associated with the digitally stored information, the method can include causing the encryption keys to be transmitted from the plurality of third devices to the second user device to facilitate local decryption of the digitally stored information.

Figure 4B:
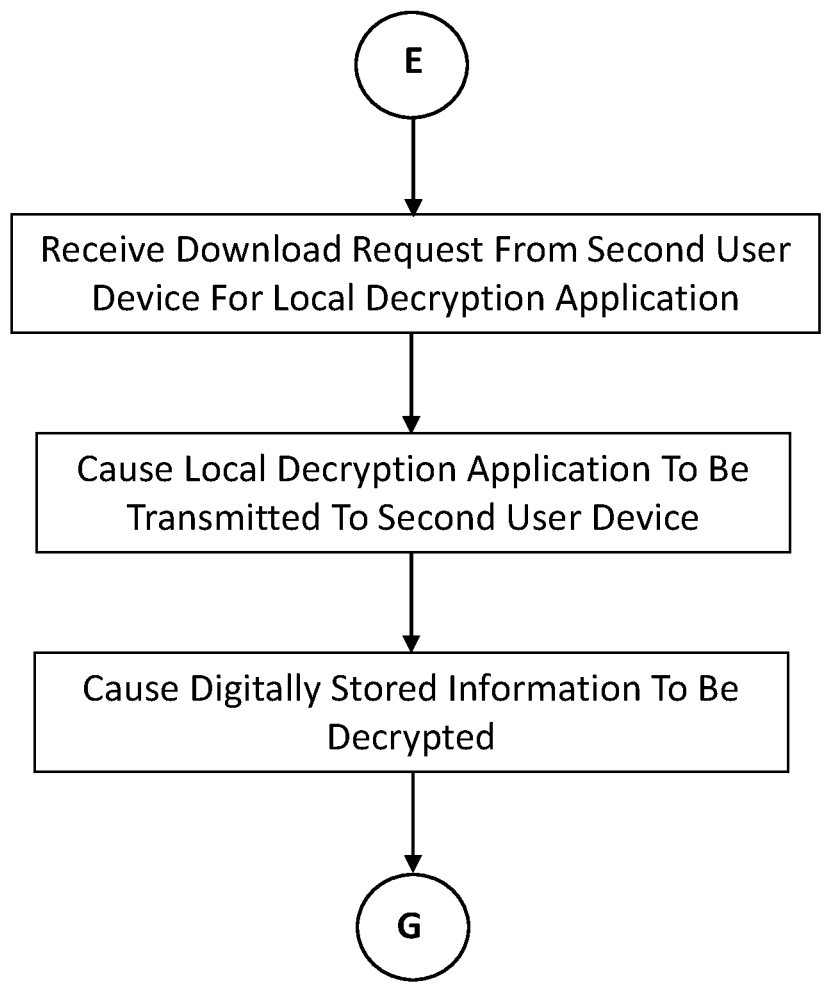

Referring still to FIGS. 1, 2A-2C and 4A, and further to FIG. 4B, in an embodiment, the second GUI can further facilitate downloading, by the at least one keyholder, a local decryption application to the second user device for causing the encrypted digitally stored information to be decrypted, using the encryption keys, after performance of the step of transmitting the digitally stored information to the second user device in the method.

Figure 5:
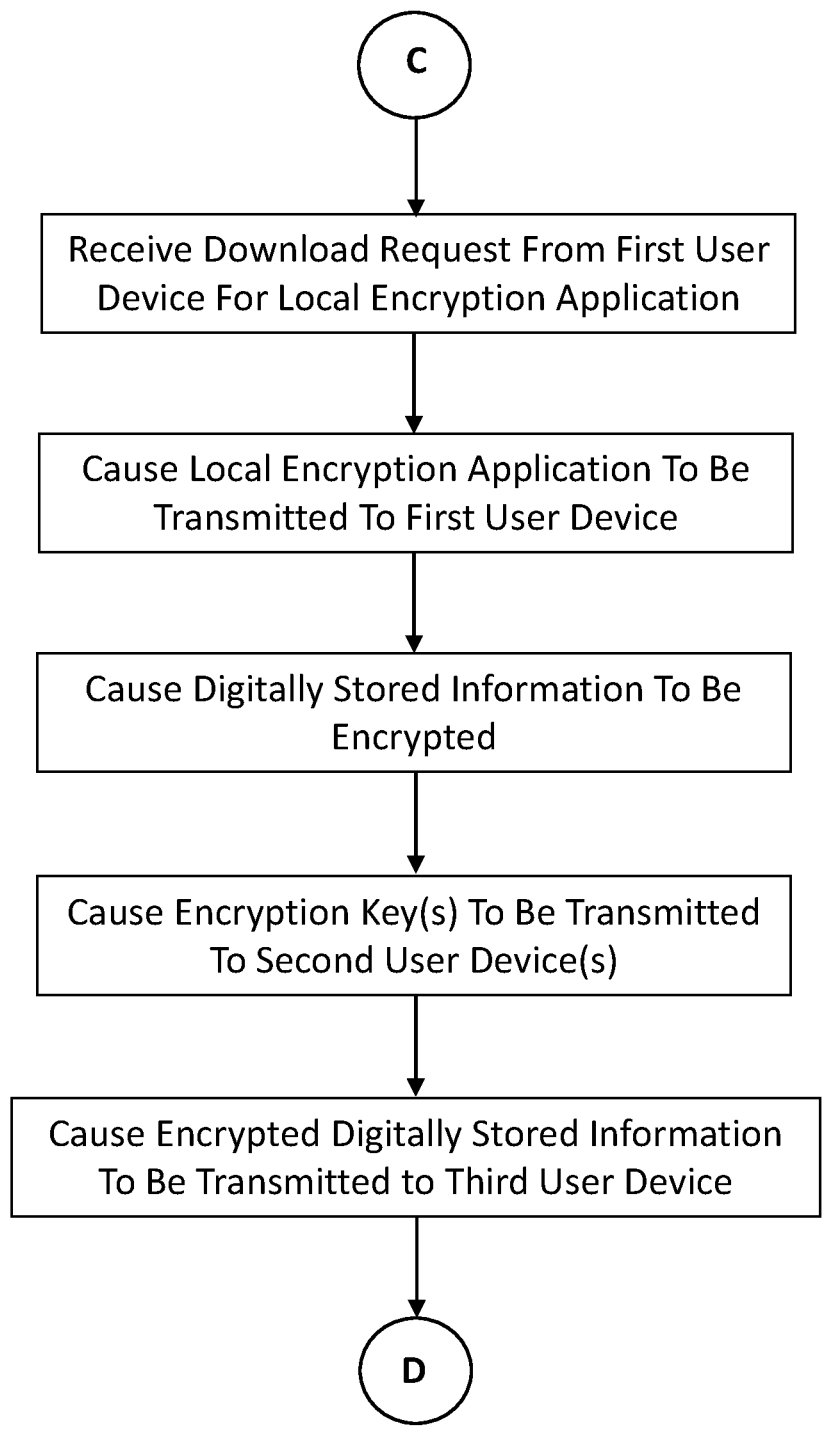
FIG. 5 depicts a flow chart of aspects of the method shown in FIGS. 2A-2C, 3, 4A and 4B in accordance with some embodiments.

With reference to FIGS. 1, 2A-2C and 5, another embodiment of the method is disclosed where the first GUI further facilitates downloading, by the owner, a local encryption application to the first user device. As shown in FIG. 5, the method further includes receiving, from the first user device, a download request for the local encryption application. In response to receiving the download request, the method includes causing the local encryption application to be transmitted to the first user device.

In the embodiment shown in FIG. 5, prior to performing the step of receiving, and storing in the vault space, the digitally stored information from the first user device, the method includes causing the digitally stored information to be encrypted using an encryption key. The encryption key is required to decrypt the encrypted digitally stored information. This encryption can be performed entirely locally on the first user device such that no unencrypted digitally stored information is transmitted to the second or third user devices or to the cloud secure access control platform (e.g., FIDELIUS) computing device over the network and likewise no unencrypted digitally stored information is stored remotely from the first user device of the owner. As such, in the embodiment, the method further includes the step of causing the encryption key to be transmitted to the second user device. In an example, the local encryption application mediates or otherwise facilitates this causing step in the method by, for instance, establishing a secure line of data communication between the first user device and the second user device for transmission of the encryption key. In another example, the local encryption application provides alphanumeric and/or graphical instructions readable by the owner which direct the owner to transmit (e.g., by email to the second user device of the keyholder) or otherwise provide the encryption key to the keyholder.

In the embodiment of FIG. 5, the method can include the step of causing the encrypted digitally stored information to be transmitted to the third user device. In an example, the local encryption application mediates or otherwise facilitates this causing step in the method by, for instance, establishing a secure line of data communication between the first user device and the third user device for transmission of the encrypted digitally stored information. In another example, the local encryption application provides alphanumeric and/or graphical instructions readable by the owner which direct the owner to transmit (e.g., by email to the third user device of the keyholder) or otherwise provide the encrypted digitally stored information to the keyholder. In the example, the step of causing the encrypted digitally stored information to be transmitted from the first user device to the second user device can be performed in the method either before, or after, the step of causing the encryption key to be transmitted to the second user device. Then, in the embodiment, the step of receiving, and storing in the vault space, the digitally stored information from the first user device includes receiving, and storing in the vault space, the encrypted digitally stored information from the first user device. As such, and with the guardian in possession of the encrypted digitally stored information, and the second user device in possession of the encryption key, the method step of causing the digitally stored information to be transmitted to the second user device includes causing the digitally stored information to be transmitted from the third user device to the second user device.

Referring still to FIGS. 1, 2A-2C and 5, and further to FIG. 4B, in an embodiment, the second GUI can further facilitate downloading, by the keyholder making the access request, a local decryption application to the second user device for causing the encrypted digitally stored information to be decrypted, using the encryption key, after performance of the step of transmitting the digitally stored information to the second user device in the method.

Figure 6:
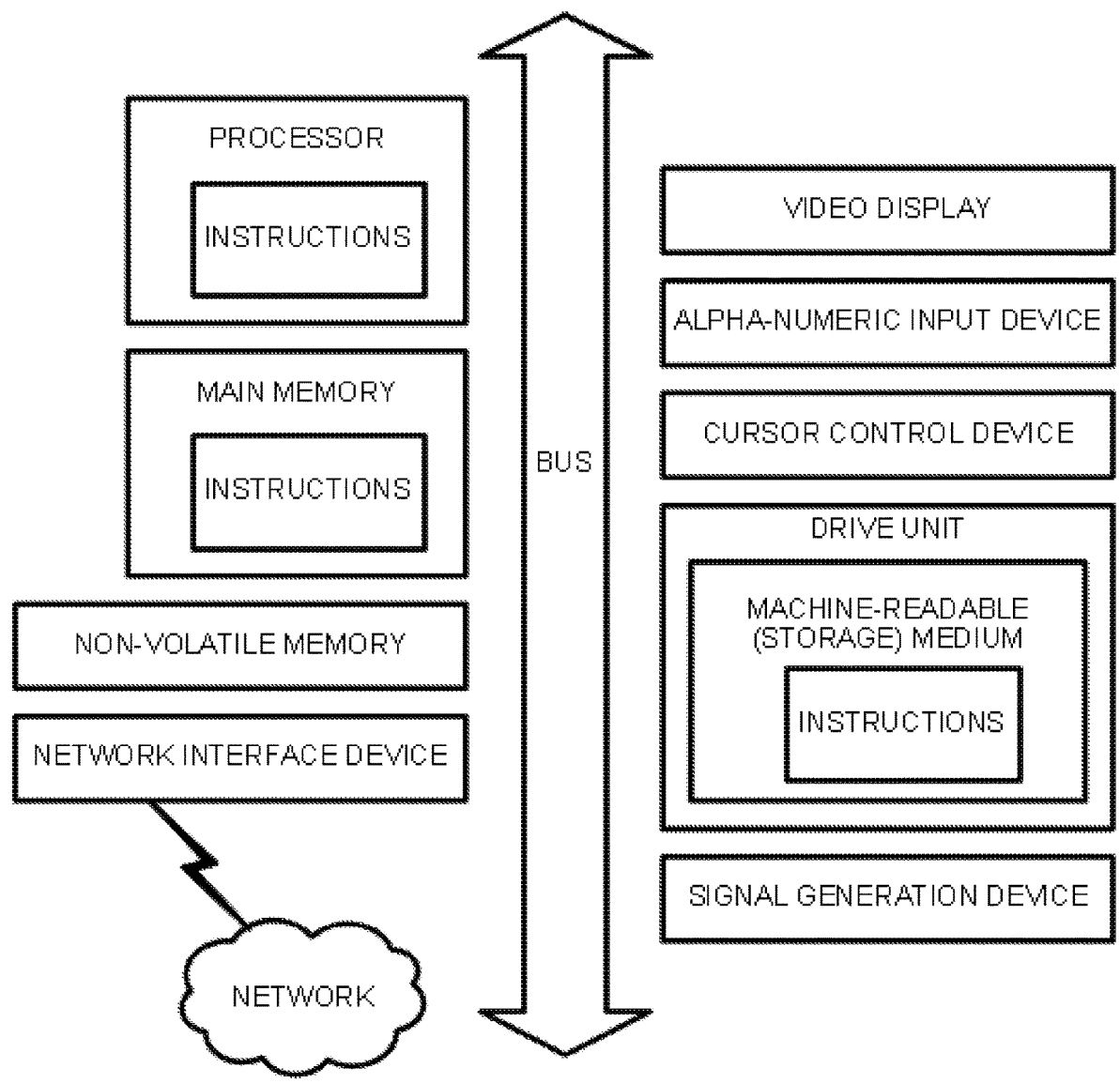
FIG. 6 depicts a diagrammatic representation of a machine, in the example form, of a computer system within which a set of instructions, for causing the machine to perform any one or more of the methodologies discussed herein, may be executed.

FIG. 6 depicts a diagrammatic representation of a machine, in the example form, of a computer system within which a set of instructions, for causing the machine to perform any one or more of the methodologies discussed herein, may be executed.

In the example of FIG. 6, the computer system includes a processor, memory, non-volatile memory, and an interface device. Various common components (e.g., cache memory) are omitted for illustrative simplicity. The computer system is intended to illustrate a hardware device on which any of the components depicted in the examples of FIGS. 1-5B (and any other components or processes described in this specification) can be implemented. For example, the computer system can be any radiating object or antenna array system. The computer system can be of one or more servers of a centralized or distributed networked computing and communication architecture of any applicable known or convenient type. The components of the computer system can be coupled together via a bus or through some other known or convenient device.

The processor may be, for example, a conventional microprocessor such as an INTEL PENTIUM microprocessor or MOTOROLA POWER PC microprocessor. One of skill in the relevant art will recognize that the terms "machine-readable (storage) medium" or "computer-readable (storage) medium" include any type of device that is accessible by the processor. In some embodiments, these storage media are embodied in non-transitory computer-readable media that can store program instructions (e.g., as software or firmware) which, when executed by one or more processors of the disclosed technology, cause the computing device of the presently disclosed technology to implement, execute, or otherwise facilitate performance of the various algorithms, processes and methods disclosed herein.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 900. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 6 reside in the interface.

In operation, the computer system of FIG. 6 can be controlled by operating system software that includes a file management system, such as a disk operating system. One example of operating system software with associated file management system software is the family of operating systems known as WINDOWS from MICROSOFT Corporation of Redmond, Wash., and their associated file management systems. Another example of operating system software with its associated file management system software is the LINUX operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an IPHONE, a BLACKBERRY, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above detailed description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above detailed description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above detailed description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112(f), other aspects may likewise be embodied as a means-plus-function claim, or in other forms, such as being embodied in a computer-readable medium (any claims intended to be treated under 35 U.S.C. § 112(f) will begin with the words "means for"). Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above detailed description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above detailed description section explicitly defines such terms. Accordingly, the actual scope of the invention encompasses not only the disclosed examples, but also all equivalent ways of practicing or implementing the invention.

What is claimed is:

1. A method executed on a computing device to provide access control to digitally stored information, the method comprising:

causing a first graphical user interface (GUI) to be displayed on a display device of a first user device accessible by an owner of the digitally stored information, wherein the first GUI is configured to facilitate entry by the owner of access control data for the digitally stored information;

allocating, in at least one data storage device in communication with the computing device, vault space for storing the digitally stored information in a location remote from the first user device;

receiving, and storing in the vault space, the digitally stored information from the first user device;

receiving, from the first user device, the access control data, wherein the access control data includes identifying information of: at least one keyholder, and at least one guardian, and wherein the first user device is: not accessible by the at least one keyholder, and not accessible by the at least one guardian;

associating the at least one keyholder and the at least one guardian with the digitally stored information;

causing a second GUI to be displayed on a display device of a second user device accessible by the at least one keyholder, wherein the second GUI is configured to facilitate transmission, to the computing device, by the at least one keyholder of an access request to the digitally stored information;

receiving, from the second user device, the access request;

determining, based at least upon the identifying information, that the at least one keyholder is associated with the digitally stored information;

in response to determining that the at least one keyholder is associated with the digitally stored information, transmitting, according to at least the identifying information, an access request notification to a third user device accessible by the at least one guardian, wherein the access request notification includes at least a portion of the identifying information of the at least one keyholder;

causing a third GUI to be displayed on a display device of the third user device, wherein the third GUI is configured to facilitate transmission, to the computing device, by the at least one guardian of an access authorization for the digitally stored information;

receiving, from the third user device, the access authorization;

determining, based at least upon the identifying information, that the at least one guardian is associated with the digitally stored information; and in response to determining that the at least one guardian is associated with the digitally stored information, causing the digitally stored information to be transmitted to the second user device.

2. The method of claim 1 further comprising allocating, in the at least one data storage device, memory space separate from the vault space for storing the access control data.

3. The method of claim 1, wherein the at least one guardian includes a plurality of guardians, each guardian of the plurality of guardians having unique identifying information, wherein the access control data further includes a required number of the plurality of guardians from whom access authorizations must be received, and wherein the method further comprises:

determining that access authorizations are received from the required number of the plurality of guardians; and causing the digitally stored information to be transmitted to the second user device further in response to determining that access authorizations are received from the required number of the plurality of guardians.

4. The method of claim 1, wherein the at least one guardian includes a plurality of guardians, each guardian of the plurality of guardians having unique identifying information, wherein the first GUI is further configured to facilitate downloading, by the owner, a local encryption application to the first user device, and wherein the method further comprises:

receiving, from the first user device, a download request for the local encryption application;

in response to receiving the download request, causing the local encryption application to be transmitted to the first user device;

prior to receiving, and storing in the vault space, the digitally stored information from the first user device, causing the digitally stored information to be encrypted using a number of encryption keys equal to a number of the plurality of guardians, wherein each of the number of encryption keys are required to decrypt the encrypted digitally stored information;

causing one encryption key of the number of encryption keys to be transmitted to a respective third user device accessible by each of the plurality of guardians; and further in response to determining that the at least one keyholder is associated with the digitally stored information, causing the encryption keys to be transmitted from the plurality of third devices to the second user device to facilitate local decryption of the digitally stored information, and wherein:

receiving, and storing in the vault space, the digitally stored information from the first user device comprises receiving, and storing in the vault space, the encrypted digitally stored information from the first user device.

5. The method of claim 4, wherein the second GUI is further configured to facilitate downloading, by the at least one keyholder, a local decryption application to the second user device for causing the encrypted digitally stored information to be decrypted, using the encryption keys, after performance of the step of transmitting the digitally stored information to the second user device in the method.

6. The method of claim 1, wherein the first GUI is further configured to facilitate downloading, by the owner, a local encryption application to the first user device, and wherein the method further comprises:

receiving, from the first user device, a download request for the local encryption application;

in response to receiving the download request, causing the local encryption application to be transmitted to the first user device;

prior to receiving, and storing in the vault space, the digitally stored information from the first user device, causing the digitally stored information to be encrypted using an encryption key, wherein the encryption key is required to decrypt the encrypted digitally stored information;

causing the encryption key to be transmitted to the second user device; and causing the encrypted digitally stored information to be transmitted to the third user device, and wherein:

receiving, and storing in the vault space, the digitally stored information from the first user device comprises receiving, and storing in the vault space, the encrypted digitally stored information from the first user device; and causing the digitally stored information to be transmitted to the second user device comprises causing the digitally stored information to be transmitted from the third user device to the second user device.

7. The method of claim 6, wherein the second GUI is further configured to facilitate downloading, by the at least one keyholder, a local decryption application to the second user device for decrypting, using the encryption key, the encrypted digitally stored information after performance of the method step of causing the digitally stored information to be transmitted to the second user device.

8. A non-transitory computer readable storage medium having stored thereon program instructions which, when executed by a computing device, cause the computing device to:

cause a first graphical user interface (GUI) to be displayed on a display device of a first user device accessible by an owner of digitally stored information, wherein the first GUI is configured to facilitate entry by the owner of access control data for the digitally stored information;

allocate, in at least one data storage device in communication with the computing device, vault space for storing the digitally stored information in a location remote from the first user device;

receive, and cause to be stored in the vault space, the digitally stored information from the first user device;

receive, from the first user device, the access control data, wherein the access control data includes identifying information of: at least one keyholder, and at least one guardian, and wherein the first user device is: not accessible by the at least one keyholder, and not accessible by the at least one guardian;

associate the at least one keyholder and the at least one guardian with the digitally stored information;

cause a second GUI to be displayed on a display device of a second user device accessible by the at least one keyholder, wherein the second GUI is configured to facilitate transmission, to the computing device, by the at least one keyholder of an access request to the digitally stored information;

receive, from the second user device, the access request;

determine, based at least upon the identifying information, that the at least one keyholder is associated with the digitally stored information;

in response to determining that the at least one keyholder is associated with the digitally stored information, cause an access request notification to be transmitted, according to at least the identifying information, to a third user device accessible by the at least one guardian, wherein the access request notification includes at least a portion of the identifying information of the at least one keyholder;

cause a third GUI to be displayed on a display device of the third user device, wherein the third GUI is configured to facilitate transmission, to the computing device, by the at least one guardian of an access authorization for the digitally stored information;

receive, from the third user device, the access authorization;

determine, based at least upon the identifying information, that the at least one guardian is associated with the digitally stored information; and in response to determining that the at least one guardian is associated with the digitally stored information, cause the digitally stored information to be transmitted to the second user device.

9. The non-transitory computer readable storage medium of claim 8, wherein when executed by the computing device, the program instructions further cause the computing device to allocate in the at least one data storage device, memory space separate from the vault space for storing the access control data.

10. The non-transitory computer readable storage medium of claim 8, wherein the at least one guardian includes a plurality of guardians, each guardian of the plurality of guardians having unique identifying information, wherein the access control data further includes a required number of the plurality of guardians from whom access authorizations must be received, and wherein, when executed by the computing device, the program instructions further cause the computing device to:

determine that access authorizations are received from the required number of the plurality of guardians; and cause the digitally stored information to be transmitted to the second user device further in response to determining that access authorizations are received from the required number of the plurality of guardians.

11. The non-transitory computer readable storage medium of claim 8, wherein the at least one guardian includes a plurality of guardians, each guardian of the plurality of guardians having unique identifying information, wherein the first GUI is further configured to facilitate downloading, by the owner, a local encryption application to the first user device, and wherein when executed by the computing device, the program instructions further cause the computing device to:

receive, from the first user device, a download request for the local encryption application;

in response to receiving the download request, cause the local encryption application to be transmitted to the first user device;

prior to receiving, and storing in the vault space, the digitally stored information from the first user device, cause the digitally stored information to be encrypted using a number of encryption keys equal to a number of the plurality of guardians, wherein each of the number of encryption keys are required to decrypt the encrypted digitally stored information;

cause one encryption key of the number of encryption keys to be transmitted to a respective third user device accessible by each of the plurality of guardians; and in response to determining that the at least one keyholder is associated with the digitally stored information, cause the encryption keys to be transmitted to the second user device to facilitate local decryption of the digitally stored information, and wherein:

to receive, and store in the vault space, the digitally stored information from the first user device, the program instructions further cause the computing device to receive, and store in the vault space, the encrypted digitally stored information from the first user device.

12. The non-transitory computer readable storage medium of claim 11, wherein the second GUI is further configured to facilitate downloading, by the at least one keyholder, a local decryption application to the second user device for decrypting, using the encryption keys, the encrypted digitally stored information after the digitally stored information is transmitted to the second user device.

13. The non-transitory computer readable storage medium of claim 8, wherein the first GUI is further configured to facilitate downloading, by the owner, a local encryption application to the first user device, and wherein when executed by the computing device, the program instructions further cause the computing device to:

receive, from the first user device, a download request for the local encryption application;

in response to receiving the download request, cause the local encryption application to be transmitted to the first user device;

prior to receiving, and storing in the vault space, the digitally stored information from the first user device, cause the digitally stored information to be encrypted using an encryption key, wherein the encryption key is required to decrypt the encrypted digitally stored information;

cause the encryption key to be transmitted to the second user device; and cause the encrypted digitally stored information to be transmitted to the third user device, and wherein:

to receive, and store in the vault space, the digitally stored information from the first user device, the program instructions further cause the computing device to receive, and store in the vault space, the encrypted digitally stored information from the first user device; and to cause the digitally stored information to be transmitted to the second user device, the program instructions further cause the computing device to cause the digitally stored information to be transmitted from the third user device to the second user device.

14. The non-transitory computer readable storage medium of claim 13, wherein the second GUI is further configured to facilitate downloading, by the at least one keyholder, a local decryption application to the second user device for decrypting, using the encryption key, the encrypted digitally stored information after the digitally stored information is caused to be transmitted to the second user device.

15. A system for providing access control to digitally stored information, the system comprising: at least one data storage device, and a computing device in communication with the at least one data storage device, the computing device configured to:

cause a first graphical user interface (GUI) to be displayed on a display device of a first user device accessible by an owner of digitally stored information, wherein the first GUI is configured to facilitate entry by the owner of access control data for the digitally stored information;

allocate, in at least one data storage device in communication with the computing device, vault space for storing the digitally stored information in a location remote from the first user device;

receive, and cause to be stored in the vault space, the digitally stored information from the first user device;

receive, from the first user device, the access control data, wherein the access control data includes identifying information of: at least one keyholder, and at least one guardian, and wherein the first user device is: not accessible by the at least one keyholder, and not accessible by the at least one guardian;

associate the at least one keyholder and the at least one guardian with the digitally stored information;

cause a second GUI to be displayed on a display device of a second user device accessible by the at least one keyholder, wherein the second GUI is configured to facilitate transmission, to the computing device, by the at least one keyholder of an access request to the digitally stored information;

receive, from the second user device, the access request;

determine, based at least upon the identifying information, that the at least one keyholder is associated with the digitally stored information;

in response to determining that the at least one keyholder is associated with the digitally stored information, cause an access request notification to be transmitted, according to at least the identifying information, to a third user device accessible by the at least one guardian, wherein the access request notification includes at least a portion of the identifying information of the at least one keyholder;

cause a third GUI to be displayed on a display device of the third user device, wherein the third GUI is configured to facilitate transmission, to the computing device, by the at least one guardian of an access authorization for the digitally stored information;

receive, from the third user device, the access authorization;

determine, based at least upon the identifying information, that the at least one guardian is associated with the digitally stored information; and in response to determining that the at least one guardian is associated with the digitally stored information, cause the digitally stored information to be transmitted to the second user device.

16. The system of claim 15, wherein the computing device is further configured to cause the computing device to allocate in the at least one data storage device, memory space separate from the vault space for storing the access control data.

17. The system of claim 15, wherein the at least one guardian includes a plurality of guardians, each guardian of the plurality of guardians having unique identifying information, wherein the access control data further includes a required number of the plurality of guardians from whom access authorizations must be received, and wherein the computing device is further configured to:

determine that access authorizations are received from the required number of the plurality of guardians; and cause the digitally stored information to be transmitted to the second user device further in response to determining that access authorizations are received from the required number of the plurality of guardians.

18. The system of claim 15, wherein the at least one guardian includes a plurality of guardians, each guardian of the plurality of guardians having unique identifying information, wherein the first GUI is further configured to facilitate downloading, by the owner, a local encryption application to the first user device, and wherein the computing device is further configured to:

receive, from the first user device, a download request for the local encryption application;

in response to receiving the download request, cause the local encryption application to be transmitted to the first user device;

prior to receiving, and storing in the vault space, the digitally stored information from the first user device, cause the digitally stored information to be encrypted using a number of encryption keys equal to a number of the plurality of guardians, wherein each of the number of encryption keys are required to decrypt the encrypted digitally stored information;

cause one encryption key of the number of encryption keys to be transmitted to a respective third user device accessible by each of the plurality of guardians; and in response to determining that the at least one keyholder is associated with the digitally stored information, cause the encryption keys to be transmitted to the second user device to facilitate local decryption of the digitally stored information, and wherein:

to receive, and store in the vault space, the digitally stored information from the first user device, the computing device is further configured to receive, and store in the vault space, the encrypted digitally stored information from the first user device.

19. The system of claim 18, wherein the second GUI is further configured to facilitate downloading, by the at least one keyholder, a local decryption application to the second user device for decrypting, using the encryption keys, the encrypted digitally stored information after the digitally stored information is transmitted to the second user device.

20. The system of claim 15, wherein the first GUI is further configured to facilitate downloading, by the owner, a local encryption application to the first user device, and wherein the computing device is further configured to:

receive, from the first user device, a download request for the local encryption application;

in response to receiving the download request, cause the local encryption application to be transmitted to the first user device;

prior to receiving, and storing in the vault space, the digitally stored information from the first user device, cause the digitally stored information to be encrypted using an encryption key, wherein the encryption key is required to decrypt the encrypted digitally stored information;

cause the encryption key to be transmitted to the second user device; and cause the encrypted digitally stored information to be transmitted to the third user device, and wherein:

to receive, and store in the vault space, the digitally stored information from the first user device, the computing device is further configured to receive, and store in the vault space, the encrypted digitally stored information from the first user device; and to cause the digitally stored information to be transmitted to the second user device, the computing device is further configured to cause the digitally stored information to be transmitted from the third user device to the second user device.

21. The system of claim 20, wherein the second GUI is further configured to facilitate downloading, by the at least one keyholder, a local decryption application to the second user device for decrypting, using the encryption key, the encrypted digitally stored information after the digitally stored information is caused to be transmitted to the second user device.

* * * * *